(12) United States Patent
Morgan et al.

(10) Patent No.: US 10,872,702 B2
(45) Date of Patent: *Dec. 22, 2020

(54) STATIONARY ISOLATED ROD COUPLINGS FOR USE IN A NUCLEAR REACTOR CONTROL ROD DRIVE

(71) Applicant: GE-Hitachi Nuclear Energy Americas LLC, Wilmington, NC (US)

(72) Inventors: Kenneth A. Morgan, Wilmington, NC (US); David L. Major, Wilmington, NC (US); Randy M. Brown, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 741 days.

This patent is subject to a terminal disclaimer.

(21) Appl. No.: 15/640,428

(22) Filed: Jun. 30, 2017

(65) Prior Publication Data

US 2018/0019026 A1   Jan. 18, 2018

Related U.S. Application Data

(60) Provisional application No. 62/361,625, filed on Jul. 13, 2016, provisional application No. 62/361,604, (Continued)

(51) Int. Cl.
  *G21C 7/12* (2006.01)
  *G21C 7/14* (2006.01)
  *F16B 1/00* (2006.01)

(52) U.S. Cl.
  CPC ............. *G21C 7/14* (2013.01); *G21C 7/12* (2013.01); *F16B 2001/0035* (2013.01); *Y02E 30/30* (2013.01)

(58) Field of Classification Search
  CPC ... G21C 7/10; G21C 7/12; G21C 7/14; G21C 7/18
  See application file for complete search history.

(56) References Cited

U.S. PATENT DOCUMENTS 2,803,761 A     8/1957  Young
2,917,444 A *  12/1959  Dreffin ................. G21C 7/22
                                                            376/328

(Continued)

FOREIGN PATENT DOCUMENTS

JP     57-168192     10/1982
JP     06-235785      8/1994

OTHER PUBLICATIONS

Yoritsune et al., "In-vessel Type Control Rod Drive Mechanism Using Magnetic Force Latching for a Very Small Reactor," Aug. 2002, J. Nuc. Sci. & Tech., vol. 39, No. 8, p. 913-922.

(Continued)

*Primary Examiner* — Sharon M Davis
(74) *Attorney, Agent, or Firm* — Ryan Alley IP

(57) ABSTRACT

Control rod drives include linearly-moveable control elements inside an isolation barrier. Control rod drives move the control element through secured magnetic elements subject to magnetic fields. Induction coils may generate the magnetic fields across a full stroke length of the control element in the reactor. A closed coolant loop may cool the induction coils, which may be in a vacuum outside the isolation barrier. A control rod assembly may house the magnetic elements and directly, removably join to the control element. The control rod assembly may lock with magnetic overtravel latches inside the isolation barrier to maintain an overtravel position. Overtravel release coils outside the isolation barrier may release the latches to leave the overtravel position. Methods of operation include selectively energizing or de-energizing induction coils to drive (Continued)

the control element to desired insertion points, including full insertion by gravity following de-energization. No direct connection may penetrate the isolation barrier.

20 Claims, 4 Drawing Sheets

Related U.S. Application Data filed on Jul. 13, 2016, provisional application No. 62/361,628, filed on Jul. 13, 2016.

(56) References Cited

U.S. PATENT DOCUMENTS

| | | | |
|---|---|---|---|
| 3,566,224 A * | 2/1971 | Vallauri | G21C 7/12 318/135 |
| 3,933,581 A | 1/1976 | McKeehan et al. | |
| 3,941,653 A | 3/1976 | Thorp, II | |
| 3,992,255 A | 11/1976 | DeWesse | |
| 4,044,622 A | 8/1977 | Matthews | |
| 4,048,010 A | 9/1977 | Eschenfelder et al. | |
| 4,076,584 A * | 2/1978 | Golden | G21C 7/12 376/229 |
| 4,092,213 A | 5/1978 | Nishimura | |
| 4,147,589 A | 4/1979 | Roman et al. | |
| 4,288,898 A | 9/1981 | Adcock | |
| 4,338,159 A | 7/1982 | Martin | |
| 4,369,161 A | 1/1983 | Martin | |
| 4,423,002 A | 12/1983 | Wiart et al. | |
| 4,484,093 A | 11/1984 | Smith | |
| 4,518,559 A | 5/1985 | Fischer et al. | |
| 5,276,719 A | 1/1994 | Batheja et al. | |
| 5,307,384 A * | 4/1994 | King | G21C 7/12 376/228 |
| 5,428,873 A | 7/1995 | Hitchcock et al. | |
| 5,517,536 A | 5/1996 | Golberg et al. | |
| 5,778,034 A | 7/1998 | Tani | |
| 8,571,162 B2 | 10/2013 | Maruyama et al. | |
| 8,757,065 B2 | 6/2014 | Fjerstad et al. | |
| 8,811,562 B2 | 8/2014 | DeSantis | |
| 8,915,161 B2 | 12/2014 | Akatsuka et al. | |
| 9,305,669 B2 | 4/2016 | Hyde | |
| 9,336,910 B2 | 5/2016 | Shargots et al. | |
| 2015/0255178 A1 | 9/2015 | Tsuchiya et al. | |

OTHER PUBLICATIONS

CIPO, Office Action in corresponding CA application 3,029,815, dated Oct. 16, 2019.

JPO, Office Action in corresponding JP application 2019-501439, dated Mar. 25, 2020.

* cited by examiner

STATIONARY ISOLATED ROD COUPLINGS FOR USE IN A NUCLEAR REACTOR CONTROL ROD DRIVE

RELATED APPLICATIONS

This application claims priority under 35 U.S.C. § 119 to U.S. Provisional Applications 62/361,604; 62/361,625; 62/361,628, all filed Jul. 13, 2016 and incorporated by reference herein in their entireties.

BACKGROUND

FIG. 1 is an illustration of a drive rod-control rod assembly (CRA) connection 10 useable with example embodiment control drives. In most conventional PWR control rod assemblies, drive rod 11 and actuating rod 12 extend in lateral support tube 16 from above a reactor pressure vessel 1 down to a lockable spud or bayonet 13 that joins to CRA 15 via locking plug 14. CRA 15 contains neutron absorbent materials what can be used to control a nuclear chain reaction based on an amount of vertical insertion. Control rods are driven from above by vertical movement of actuating rod 12 and drive rod 13, under force from the control rod drive mechanism.

The following documents are incorporated herein by reference in their entireties: US Pat Pub 2015/0255178 to Tsuchiya et al; U.S. Pat. No. 4,423,002 to Wiart et al.; U.S. Pat. No. 4,369,161 to Martin; U.S. Pat. No. 4,338,159 to Martin et al.; U.S. Pat. No. 4,044,622 to Matthews; U.S. Pat. No. 9,305,669 to Hyde et al.; U.S. Pat. No. 3,933,581 to McKeehan et al.; U.S. Pat. No. 4,048,010 to Eschenfelder et al.; U.S. Pat. No. 4,092,213 to Nishimura; U.S. Pat. No. 4,147,589 to Roman et al.; U.S. Pat. No. 4,288,898 to Adcock; U.S. Pat. No. 4,484,093 to Smith; U.S. Pat. No. 5,276,719 to Batheja; U.S. Pat. No. 8,915,161 to Akatsuka et al.; U.S. Pat. No. 4,518,559 to Fischer et al.; U.S. Pat. No. 5,517,536 to Goldberg et al.; U.S. Pat. No. 5,428,873 to Hitchcock et al.; U.S. Pat. No. 8,571,162 to Maruyama et al.; U.S. Pat. No. 8,757,065 to Fjerstad et al.; U.S. Pat. No. 5,778,034 to Tani; U.S. Pat. No. 9,336,910 to Shargots et al.; U.S. Pat. No. 3,941,653 to Thorp, II; U.S. Pat. No. 3,992,255 to DeWesse; U.S. Pat. No. 8,811,562 to DeSantis; and "In-vessel Type Control Rod Drive Mechanism Using Magnetic Force Latching for a Very Small Reactor" Yoritsune et al., J. Nuc. Sci. & Tech., Vol. 39, No. 8, p. 913-922 (August 2002).

SUMMARY

Example embodiments include control rod drives including linearly-moveable control elements to control neutronics in a nuclear reactor. Example control rod drives may include an isolation barrier impermeably separating pressurized reactor internals from external spaces like containment. One or more induction coils are outside of the isolation barrier, while the control element is inside the isolation barrier in the reactor. Example control rod drives may move the control element via a magnet immovably connected to the same by energizing and de-energizing the induction coils to linearly drive the magnets. The induction coils may be secured in a vertical distance to fully move the magnets across a whole distance equivalent to complete insert and withdrawal of the control element from the reactor. A closed coolant loop may cool the induction coils, which may otherwise be maintained in a vacuum or other environment distinct from reactor internals in a housing about an end of the reactor. Example embodiment control rod drives may include a control rod assembly housing the magnet that directly joins to the control element. The control rod assembly may lock with magnetic overtravel latches inside the isolation barrier to maintain an overtravel position. Overtravel release coils outside the isolation barrier can release or otherwise move the latches, which may be spring-biased, to adjust the connection between the latches and assembly.

Example methods include energizing and/or de-energizing at least one induction coil to drive the control element via the magnetic material secured to the same. In this way, the control element may be inserted and withdrawn with no mechanical linkage permeating the isolation barrier. With multiple induction coils, individual coils may be selectively energized and de-energized to drive the magnetic material between the same, thus driving the control element. When all coils are de-energized, the control element may be driven by gravity into a reactor, achieving a scram. Example methods may drive the control rod to an overtravel position, where overtravel latches hold the same, for removal, attachment, and/or other maintenance of the control element from/to/on the control rod assembly. Following desired overtravel actions, the overtravel coils may be energized to release the latches through magnetic materials in the latch biasing them to an open position.

BRIEF DESCRIPTIONS OF THE DRAWINGS

Example embodiments may become more apparent by describing, in detail, the attached drawings, wherein like elements are represented by like reference numerals, which are given by way of illustration only and thus do not limit the terms which they depict.

DETAILED DESCRIPTION

Figure 1:
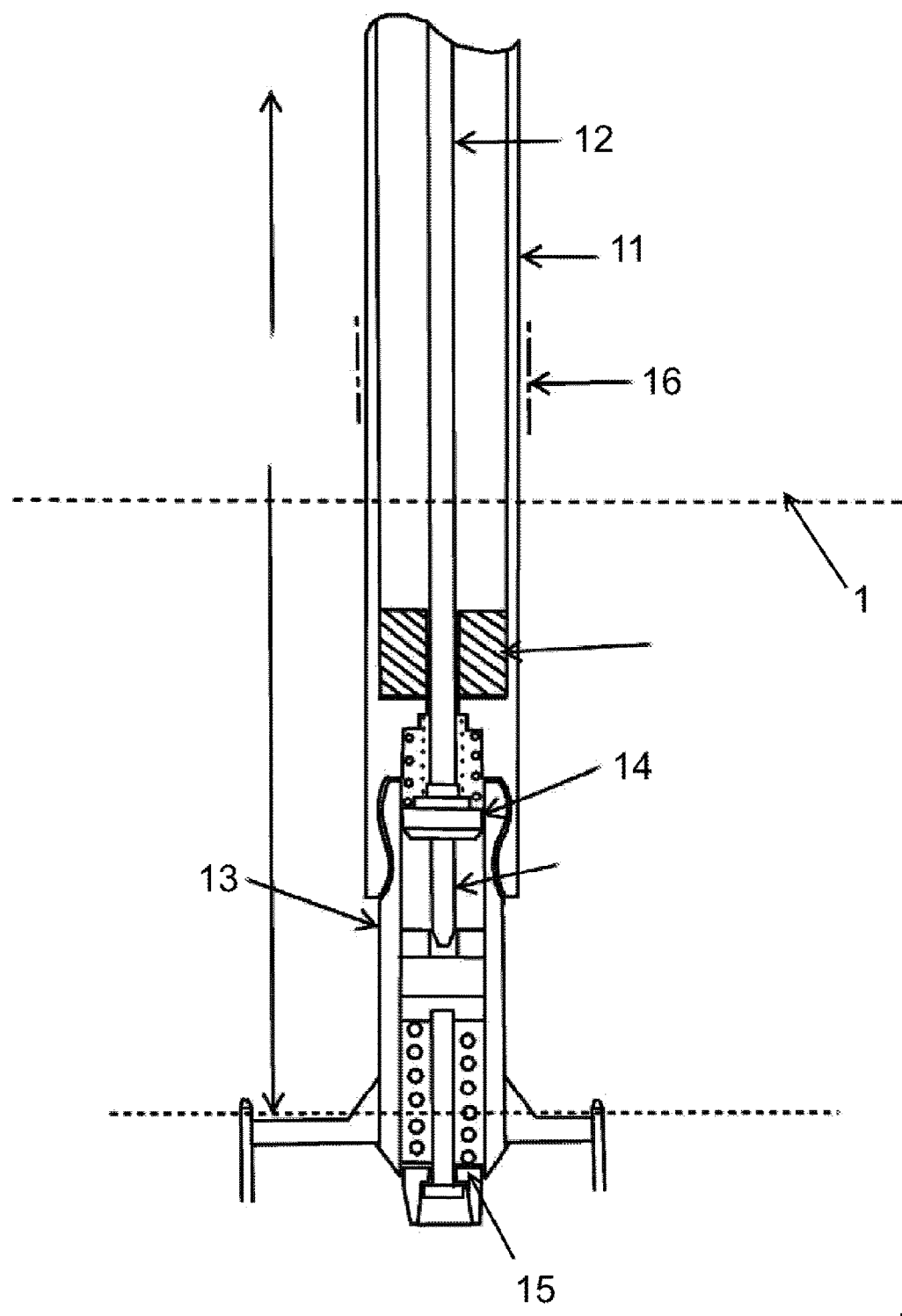
FIG. 1 is an illustration of a drive rod connection to a control rod assembly useable in example embodiments.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It may be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or"

includes all combinations of one or more of the associated listed items. The use of "etc." is defined as "et cetera" and indicates the inclusion of all other elements belonging to the same group of the preceding items, in any "and/or" combination(s).

It may be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It may be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

The Inventors have newly recognized that control rod drives in nuclear reactors are typically mechanical drives using direct contact points that must pass through or be inside a reactor CRDM pressure boundary 150. Such direct contact and positioning creates a challenging environment for the mechanical drives that typically must operate to move control rods over a period of several months or years without maintenance. For example, reactor temperatures, leaked coolant, and noncondensible gasses found inside example embodiment CRDM 100 pressure boundary 150 can cause corrosion and associated stress corrosion cracking, hydriding, and hydrogen deflagration problems with mechanical drive parts. The cooling mechanisms and heat from direct contact with the drives interact with example embodiment CRDM 100 pressure boundary 150 to also cause thermal cycling problems during actuation of mechanical drives over the course of operation. Penetrations in a control rod drive required for mechanical connection also represent an avenue for leakage of reactor coolant. The Inventors have newly recognized a need for a control rod drive that has less engagement with example embodiment CRDM 100 pressure boundary 150 as well as mechanical contacts that represent high-failure points. Example embodiments described below uniquely enable solutions to these and other problems discovered by the Inventors.

Figure 2:
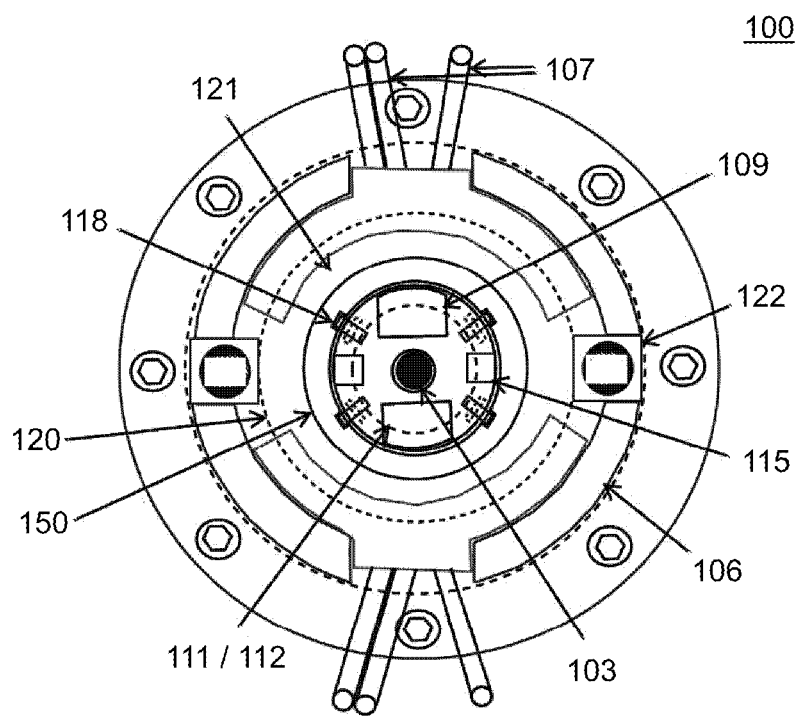
FIG. 2 is a plan illustration of an example embodiment control rod drive mechanism using extended lift coils.
Figure 3:
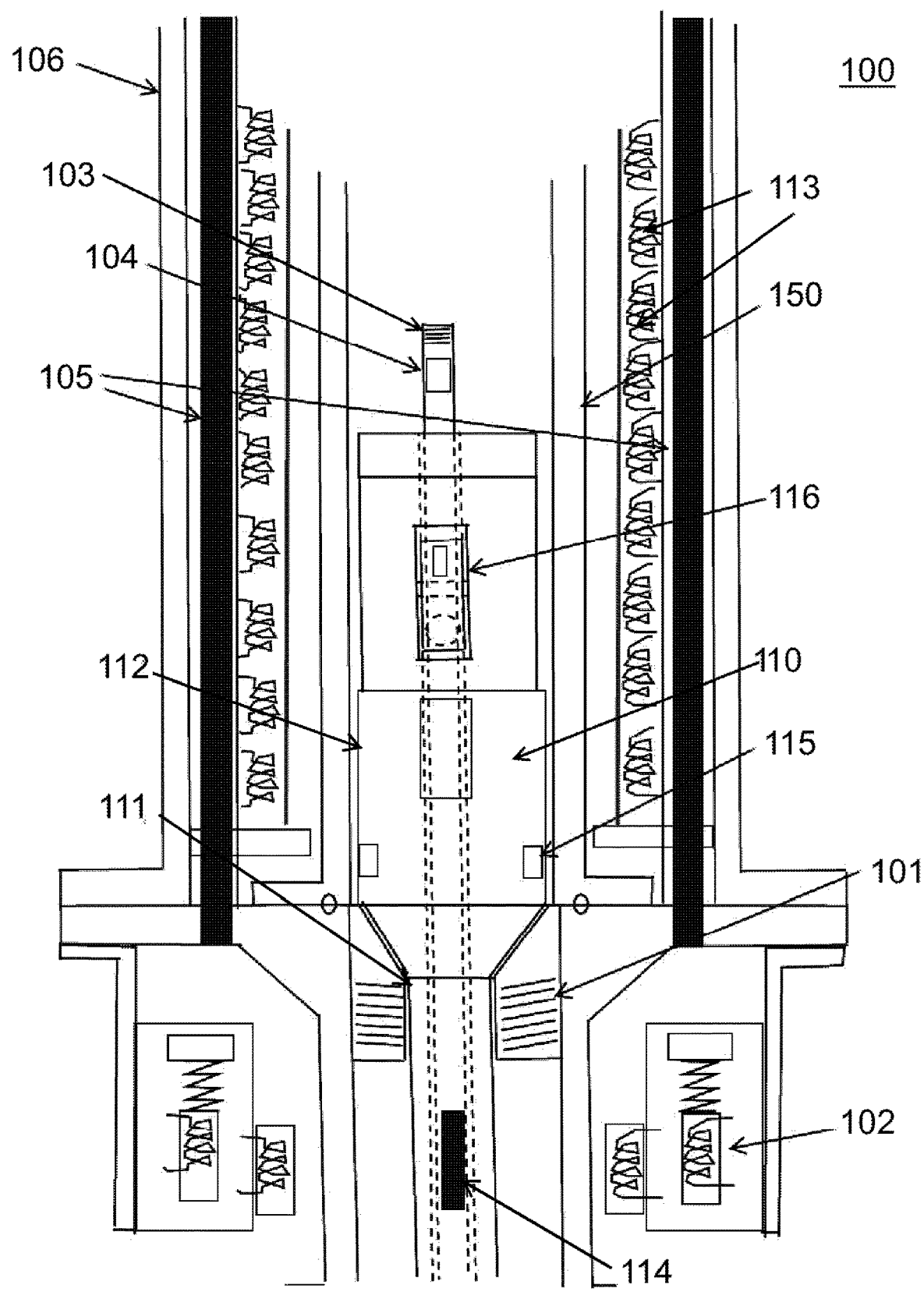
FIG. 3 is a profile illustration of the example embodiment control rod drive mechanism using extended lift coils.
Figure 4:
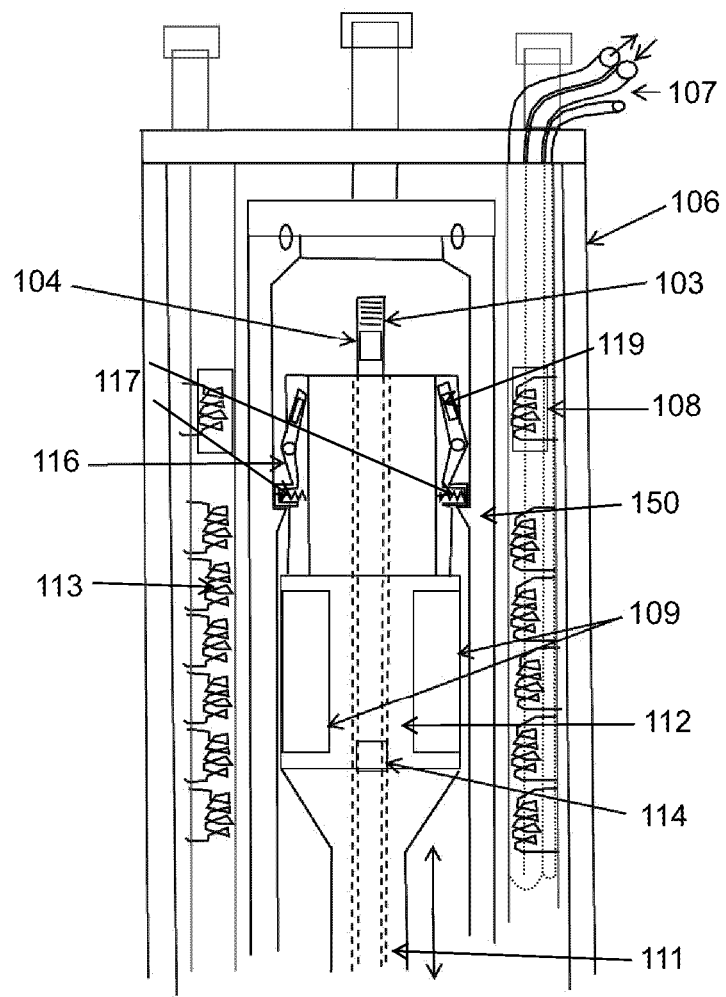
FIG. 4 is another profile illustration of the example embodiment control rod drive mechanism using extended lift coils.

FIG. 2 is a plan view illustration of an example embodiment control rod drive mechanism (CRDM) 100. FIGS. 3 and 4 are profile views of the same example embodiment CRDM 100 of FIG. 2, with FIG. 3 showing CRA 110 in a seated position and FIG. 4 showing CRA 110 in an overtravel position.

FIG. 3 illustrates a coupling and decoupling functionality between CRA 110 and the remainder of CRDM 100. As shown in FIG. 3, lift rod 111 and drive rod 112 are coupled to CRA 110 below and CRDM 100 is in a near seated position against buffer assembly 101 for scram force. The uncoupled lift rod 112 and drive rod 111 position is held constant by lift coils 113 in the energized scram coil control system as the lower solenoid actuated release coil 102 is energized to lift and hold a magnetic section 114 of internal actuating rod 103. This movement of actuating rod 103 relative to drive rod 111 compresses spring(s) above the locking plug on the lower end of actuating rod 103. Drive rod 111 is then lowered a fixed amount over the matching contours of CRA 110 coupling spud until fully seated on CRA 110. Solenoid actuated release coil 102 is de-energized and the spring force inserts locking plug 14 (FIG. 1) into CRA 110 spud, locking drive rod 111 to CRA 110. Release coil 102 operates for only a short period of time during coupling then the mechanical spring force captures CRA 110 during normal drive rod operation. Release coil 102 may generally operate for a short interval during shutdown within an air environment. Coil 102 may be cooled.

Actuating rod indication magnet 104 in the upper end of actuating rod 103 in CRDM pressure boundary 150 may provide position indication of actuating rod 103's released or engaged position though interaction with switches in position indication probes 105. Position indication probes 105 are shielded to avoid other magnetic influences and the distance between probes 105 and actuating rod indication magnets 115 are minimized to ensure reliability.

If decoupling is desired, example embodiment CRDM 100 is driven to CRA 110 seated position in buffer assembly for scram force 101. Solenoid actuated release coil 102 is energized to overcome the spring force of the locking plunger (e.g., Locking Plug of FIG. 1) and the position change of actuating rod 103 is detected to confirm release. Drive rod 111 is then slowly raised off of CRA 110 spud and above the seated control rod position by lift coils 113. Release coil 102 can be de-energized to relax the spring when CRA 110 is confirmed as released and the CRDM position is above CRA 110 seated elevation. Lift rod 112 and drive rod 111 can then be raised to an overtravel hold position (FIG. 4) if the CRDM lift coils 113 are to be de-energized for refueling operations.

If solenoid actuated release coil 102 fails to release drive rod 111 from CRA 110, an alternative mechanical actuation is available when shutdown. The upper flange of CRDM structural housing 106 may be removed and a tool may be threaded onto actuating rod 103 allowing it to be pulled while position of lift rod 112 and drive rod 111 are held fast. This action compresses the spring(s) above the lower lock plug and frees the spud of CRA 110 from drive rod 111 for maintenance and repairs.

Positioning and Scramming the CRDM

Following coupling of lift rod 112 and drive rod 111 to CRA 110, CRA 110 is positioned by lift coils 113 in the scram coil positioning and control system. Groups of lift coils 113 within the extended coil feature are sequenced on and off to magnetically couple and move lift rod 112 via lift magnets 109 (FIGS. 2 & 4) or other magnetic materials within example embodiment CRDM 100 pressure boundary 150. There may be no moving parts within CRDM structural housing 106, only vertically traveling magnetic fields produced by the arrangement of the extended scram lift coils 113. The levitated lift rod 112, drive rod 111, and CRA 110 follow the magnetic field. Feedback from position indication probes 105 continues to adjust the magnetic field generated by lift coils 113 and move CRA 110 to its desired position for reactor control. The spacing, number, and strength of the extended lift coil 113 arrangement provides the fine motion step control of the internal lift rod 112, drive rod 111, and CRA 110.

There may be a vacuum between example embodiment CRDM 100 pressure boundary 150 and extended lift coil 113 arrangement within CRDM structural housing 106 to limit heat transfer between the scram lift coils 113 and CRDM pressure boundary 150. This may provide a more uniform temperature gradient on example embodiment CRDM 100 pressure boundary 150 that minimizes thermal cycling.

Simplification of example embodiment CRDM 100 pressure boundary 150 and lift rod 112 internals may allow the size of the CRDM pressure boundary 150 to be reduced such that example embodiment CRDM 100 pressure boundary 150 wall thickness can be enhanced to minimize effects of corrosion, hydriding, and/or hydrogen deflagration problems.

Reactor safety features requiring a scram provide inputs to the control system for the extended scram lift coils 113 in their energized state. If reactor conditions warrant a scram, the control system de-energizes all of the extended lift coils 113. This drops the magnetic field levitating the internal lift rod 112, drive rod 111, and CRA 110, and gravity quickly acts on the unsupported weight to scram the reactor. Any CRDM failures causing a loss of extended scram lift coil 113 currents may also lead to a conservative control rod scram.

Guide rollers or key features 118 (FIG. 2) on the lift rod interface with example embodiment CRDM 100 pressure boundary 150 and prevent rotation of lift rod 112, drive rod 111, and CRA 110 during operational shims. CRDM buffer assembly for scram force 102 (FIG. 3) provides a means to dampen the impact of lift rod 112, drive rod 111, and CRA 110 during scram in addition to the spring in CRA 110 coupling.

Position indication magnets 115 on lift rod 112 head actuate switches in two position indication probes 105 to provide position indication and scram response timing for CRDM performance analysis. Portions of the extended scram lift coils 113 are continuously energized during CRDM operation and may be cooled with cooling flow through their travel range. Coolant inlet/outlets 107 (FIG. 4) are connected to a fixed position at the top of CRDM 100 and run throughout the coil arrangement.

CRDM Preparation for Refueling Process

Drive rod 111 is decoupled from CRA 110 as described above. The extended scram lift coils 113 and their control system are then used to maneuver lift rod 112 and drive rod 111 to an overtravel position as shown in FIG. 4. In the overtravel position, two spring actuated overtravel latches 116 engage a shoulder or window in example embodiment CRDM 100 pressure boundary 150 to lock CRDM 100 at the overtravel height. Power can then be secured or shut down to the extended scram lift coils 113 and their control system. The lower drive rod end is carried to an elevation that is clear of the upper to lower vessel disassembly process.

When refueling is completed, the extended scram lift coils 113 and their control system are energized to carry the weight of lift rod 112 and drive rod 111 in the overtravel position. Overtravel release coils 108 are then energized to compress the spring actuated structural support 117 resting on example embodiment CRDM 100 pressure boundary 150 structural support. A magnet or magnetic material 119 is drawn outward in overtravel latches 116 by the overtravel release coil 108, causing spring actuated support 117 to clear example embodiment CRDM 100 pressure boundary 150 structural support and lift rod 112 and drive rod 111 can be positioned with the extended lift coil control system to recouple CRA 110 for operation. Overtravel release coils 108 may be only briefly energized at shutdown in an air atmosphere to overcome spring forces and drive out of the overtravel position. Therefore, cooling of these coils 108 is considered optional.

CRDM Support Structure

As shown in FIG. 2, CRDM pressure boundary 150 is supported vertically off of the CRDM pressure boundary flange 120 in CRDM structural housing 106 of the RPV flange. Lateral support to upper portions of the CRDM pressure boundary 150 is not provided other than the close proximity of the scram spring coil arrangement across a vacuum gap 121.

CRDM structural housing 106 is also fixed to the CRDM nozzle pressure boundary flange 120. Insulating washers and other items can be utilized to reduce the thermal heat transfer from the RPV head to components in the CRDM 100. The extended scram lift coil arrangement is supported from CRDM structural housing 106 and not pressure boundary 150 to avoid heat conduction. PIP probes 122 are inserted vertically through the upper flange of CRDM structural housing 106 and are laterally supported at a minimum of the upper and lower ends of CRDM structural housing 106. An additional horizontal CRDM support interface can be applied between the upper vessel CRDM supports and the individual CRDM support structures.

Example embodiments and methods thus being described, it may be appreciated by one skilled in the art that example embodiments may be varied and substituted through routine experimentation while still falling within the scope of the following claims. For example, a generally vertical orientation with control rod drives above a pressure vessel is shown in connection with some examples; however, other configurations and locations of control rods and control rod drives, are compatible with example embodiments and methods simply through proper dimensioning and placement—and fall within the scope of the claims. Such variations are not to be regarded as departure from the scope of these claims.

What is claimed is:

1. A control rod drive for positioning a control element in a nuclear reactor, the drive comprising:
   an isolation barrier;
   an induction coil wound about an axis, wherein the axis is outside of the isolation barrier;
   a magnetic material inside the isolation barrier, wherein the material is configured to secure to the control element, and wherein the isolation barrier is impermeable to gasses and fluids such that a pressure gradient may be maintained across the inside and the outside of the isolation barrier; and
   a housing containing the induction coil and the isolation barrier, wherein the housing is configured to maintain a vacuum outside the isolation barrier.

2. The control rod drive of claim 1, further comprising:
   a plurality of the induction coils aligned in a length at least equal to an entire stroke distance of the control element.

3. The control rod drive of claim 2, wherein the plurality of induction coils includes a first induction coil and a second induction coil each wound about separate axes outside the isolation barrier.

4. The control drive of claim 1, further comprising:
a closed coolant channel along the induction coil configured to carry a coolant flow to cool the induction coil.

5. The control rod drive of claim 1, wherein the induction coil is immobile and does not move with the magnetic material and control element.

6. The control rod drive of claim 1, wherein the magnetic material is at least one of a permanent magnet and an electromagnet, and wherein the material is positioned at a vertical end of an actuating rod of the control element.

7. The control rod drive of claim 1, further comprising:
a coolant inlet and outlet in the housing.

8. The control rod drive of claim 1, further comprising:
a plurality of magnetic overtravel latches inside the isolation barrier configured to hold the control element in an overtravel position; and
a plurality of overtravel release coils outside the isolation barrier configured to move the overtravel latches into a release position.

9. The control rod drive of claim 8, wherein each of the magnetic overtravel latches includes a spring biasing the overtravel latch into a holding position, and wherein the overtravel release coils are configured to bias compress the spring through magnetic force.

10. The control rod drive of claim 1, further comprising:
a control rod assembly in which the magnetic material is secured, wherein the control rod assembly includes a drive rod and lift rod, and wherein the control rod assembly is configured to directly join to the control element.

11. A control rod drive for positioning a control element in a nuclear reactor, the drive comprising:
an isolation barrier;
an induction coil outside of the isolation barrier;
a magnetic material inside the isolation barrier, wherein the material is configured to secure to the control element, and wherein the isolation barrier is impermeable to gasses and fluids such that a pressure gradient may be maintained across the inside and the outside of the isolation barrier; and
a housing containing the induction coil and the isolation barrier, wherein the housing is configured to maintain a vacuum outside the isolation barrier.

12. The control rod drive of claim 11, further comprising:
a coolant inlet and outlet in the housing.

13. The control rod drive of claim 11, further comprising:
a plurality of the induction coils aligned in a length at least equal to an entire stroke distance of the control element.

14. The control drive of claim 11, further comprising:
a closed coolant channel along the induction coil configured to carry a coolant flow to cool the induction coil.

15. The control rod drive of claim 11, wherein the induction coil is immobile and does not move with the magnetic material and control element.

16. The control rod drive of claim 11, wherein the magnetic material is at least one of a permanent magnet and an electromagnet, and wherein the material is positioned at a vertical end of an actuating rod of the control element.

17. A control rod drive for positioning a control element in a nuclear reactor, the drive comprising:
an isolation barrier;
an induction coil outside of the isolation barrier;
a magnetic material inside the isolation barrier, wherein the material is configured to secure to the control element, and wherein the isolation barrier is impermeable to gasses and fluids such that a pressure gradient may be maintained across the inside and the outside of the isolation barrier;
a plurality of magnetic overtravel latches inside the isolation barrier configured to hold the control element in an overtravel position; and
a plurality of overtravel release coils outside the isolation barrier configured to move the overtravel latches into a release position.

18. The control rod drive of claim 17, wherein each of the magnetic overtravel latches includes a spring biasing the overtravel latch into a holding position, and wherein the overtravel release coils are configured to bias compress the spring through magnetic force.

19. The control drive of claim 17, further comprising:
a closed coolant channel along the induction coil configured to carry a coolant flow to cool the induction coil.

20. The control rod drive of claim 17, wherein the magnetic material is at least one of a permanent magnet and an electromagnet, and wherein the material is positioned at a vertical end of an actuating rod of the control element.

* * * * *